United States Patent [19]

Boussert

[11] Patent Number: 4,695,357
[45] Date of Patent: Sep. 22, 1987

[54] REMOVAL OF UNSATURATED HYDROCARBONS IN ANHYDROUS HYDROGEN HALIDE BY INFRARED LASER RADIATION

[75] Inventor: Anne S. Boussert, Baton Rouge, La.

[73] Assignee: The Dow Chemical Company, Midland, Mich.

[21] Appl. No.: 801,258

[22] Filed: Nov. 25, 1985

[51] Int. Cl.[4] ............................................. B01J 1/10
[52] U.S. Cl. .......................... 204/157.41; 204/157.48; 204/158.2; 204/158.21
[58] Field of Search ...................... 204/157.41, 158.21, 204/158.2, 157.48

[56] References Cited

U.S. PATENT DOCUMENTS

| | | |
|---|---|---|
| 3,446,586 | 5/1969 | Young . |
| 3,977,952 | 8/1976 | Knoevenagel et al. . |
| 3,996,029 | 12/1976 | Gustafson et al. . |
| 4,035,473 | 7/1977 | Urioste et al. . |
| 4,045,316 | 8/1977 | Legan . |
| 4,063,896 | 12/1977 | Merritt et al. . |
| 4,115,078 | 9/1978 | Janner et al. . |
| 4,146,449 | 3/1979 | Clark et al. ................... 204/158.21 |
| 4,158,614 | 6/1979 | Schuster et al. . |
| 4,206,188 | 6/1980 | Megerle . |
| 4,230,546 | 10/1980 | Ronn . |
| 4,287,038 | 9/1981 | Geiser et al. ................... 204/158.21 |
| 4,436,709 | 3/1984 | Gauthier et al. . |

OTHER PUBLICATIONS

Chem. Abstracts 86:197828f (1976).
Chem. Abstracts 91:115251d (1979).
Chem. Abstracts 95:159761g (1979).
Chem. Abstracts 97:47053n (1982).
Chem. Abstracts 97:144465f (1980).
Chem. Abstracts 98:135107j (1982).
Derwent 02237X/02 (06/14/74).
Klein et al., *Spectroscopy Letters*, 8(5), pp. 247-261, 1975.
Tardieu de Maleissye et al., *Chemical Physics Letters*, vol. 43 #3, Sep. 15, 1976.
Kojima et al., *Ind. Eng. Chem. Prod. Res. Dev.*, 1981, 20, pp. 396-399.
Ready, John R.; Academic Press, 1971, Chapter 5, "Gas Breakdown".

*Primary Examiner*—Arthur P. Demers

[57] ABSTRACT

Ethylene and like organic impurities are removed from anhydrous hydrogen halide by subjecting a gaseous stream of the hydrogen halide to laser radiation having a wavelength corresponding to a wavelength at which the ethylene absorbs radiation, in an amount effective to achieve dielectric breakdown.

14 Claims, 1 Drawing Figure

REMOVAL OF UNSATURATED HYDROCARBONS IN ANHYDROUS HYDROGEN HALIDE BY INFRARED LASER RADIATION

BACKGROUND OF THE INVENTION

This invention relates to a process for the removal of unsaturated hydrocarbons from a stream of anhydrous hydrogen halide.

Commercially produced hydrogen halides, such as hydrogen chloride, normally contain small amounts, e.g., up to about 0.5% by volume of organic impurities, such as ethylene, propylene or other low-boiling alkylenes, acetylene and chlorinated hydrocarbons such as chloroethylene and ethyl chloride.

Known methods of removing such organic impurities from hydrogen chloride include fractional liquefaction, distillation, scrubbing and catalytic conversion. These methods however, may not be satisfactory when an ultra-high-purity hydrogen chloride is desired, e.g., a hydrogen chloride containing less than about 0.005% by volume organic impurities.

The decomposition of various organic compounds by subjecting them to laser radiation has long been known in the art. Thus, "The Photo-Induced Pyrolysis of Ethylene in cw $CO_2$ Laser Beam", Tardieu de Malessye et al, *Chemical Physics Letters,* Volume 43, No. 3, Sept. 15, 1976, discloses the decomposition of ethylene by subjecting it to laser radiation produced by a $CO_2$ laser operated at a wavelength of 10.6 micrometers. The ethylene was decomposed to gaseous hydrocarbons and hydrogen. Carbon and tars were also produced.

"High Temperature Pyrolysis By Laser Gas Breakdown", Kojima, *Ind. Eng. Chem. Prod. Res. Dev.,* 1981, 20, pages 396 to 399 discloses the decomposition of $C_1$-$C_6$ hydrocarbons by laser radiation form a $CO_2$ laser. The radiation induces plasma formation, resulting in decomposition of the target gas. The article discloses the application of laser radiation to various hydrocarbons, some of which do not absorb radiation of the wavelength produced by a $CO_2$ laser. When a molecule is irradiated with radiation at a wavelength at which it readily absorbs, decomposition occurs in a unique way. In the experiments reported by the article, ethylene, which absorbs strongly at the wavelength of radiation produced by a $CO_2$ laser, when irradiated at that wavelength apparently decomposed into carbon and hydrogen.

*Chemical Abstracts* 86:197828f, discloses the investigation of chemical reactions in $C_2H_4$ irradiated with $CO_2$ laser pulses. A focused laser beam generated a plasma which converted $C_2H_4$ to $C_2H_2$. If the beam were not focused, there was no dehydrogenation but the $C_2H_2$ was capable of reacting with HCl.

*Chemical Abstracts* 91:115251d, discloses the irradiation of $C_2H_3Cl$ by $CO_2$ laser radiation to yield $C_2H_2$ and HCl.

U.S. Pat. No. 3,977,952 discloses the decomposition of carbon-containing compounds by subjecting them to radiation of a wavelength of 20 to 600 nm in the presence of water and oxygen in excess of the stoichiometric amount necessary for complete oxidation. Although a catalytic quantity of HCl may be present, the patent teaches that it is desirable to maintain the concentration of HCl at a predetermined level during the course of the reaction. Examples disclose the concentration of HCl to be very low. Additionally, the HCl is introduced in the form of an aqueous solution rather than in anhydrous form. Moreover, the carbon-containing compounds are converted, e.g., to $CO_2$, and are not decomposed to atomic constituents.

U.S. 4,063,896 discloses the removal of $COCl_2$ as an impurity from $BCl_3$ by subjecting the $BCl_3$ to laser radiation produced by a $CO_2$ laser. The $BCl_2$ resonates with the radiation produced by a $CO_2$ laser, transferring the absorbed energy to the $COCl_2$, which results in the dissociation of the $COCl_2$. The patent also teaches that because $C_2H_4$ also resonates with such radiation, it can be used as a diluent to affect energy transfer to the $COCl_2$.

U.S. Pat. No. 4,230,546 discloses the dissociation of various molecules by laser radiation. The desirability of matching the frequency of the laser to the absorption characteristics of the molecule being irradiated is disclosed.

Although the prior art establishes that ethylene can be decomposed with $CO_2$ laser radiation, there is lacking a suggestion that small amounts thereof in a gaseous hydrogen halide can be decomposed into products readily removable from the hydrogen halide. In fact, if anything, the opposite is suggested.

OBJECTS OF THE INVENTION

It is a primary object of the invention to provide a method for removing small amounts of organics from gaseous hydrogen halides, and thereby produce hydrogen halides which are substantially free from organic impurities.

It is further object of the invention to provide such a method for producing hydrogen halides substantially free of organic impurities, efficiently and economically.

Upon further study of the specification and appended claims, further objects and advantages of this invention will become apparent to those skilled in the art.

SUMMARY OF THE INVENTION

This invention relates to a process for converting ethylenically unsaturated hydrocarbons of from 2-3 carbon atoms and acetylene, in anhydrous hydrogen halide containing up to about 4,000 ppm by volume thereof, into one or more reaction products readily separable from the hydrogen halide, comprising subjecting the hydrogen halide containing the organic impurities to laser radiation having a wavelength corresponding to a wavelength at which the impurity absorbs radiation, in an amount effective to achieve dielectric breakdown.

BRIEF DESCRIPTION OF THE DRAWINGS

Various other objects, features and attendant advantages of the present invention will be more fully appreciated as the same becomes better understood when considered in connection with the accompanying drawing, wherein.

DETAILED DISCUSSION

Figure 1:
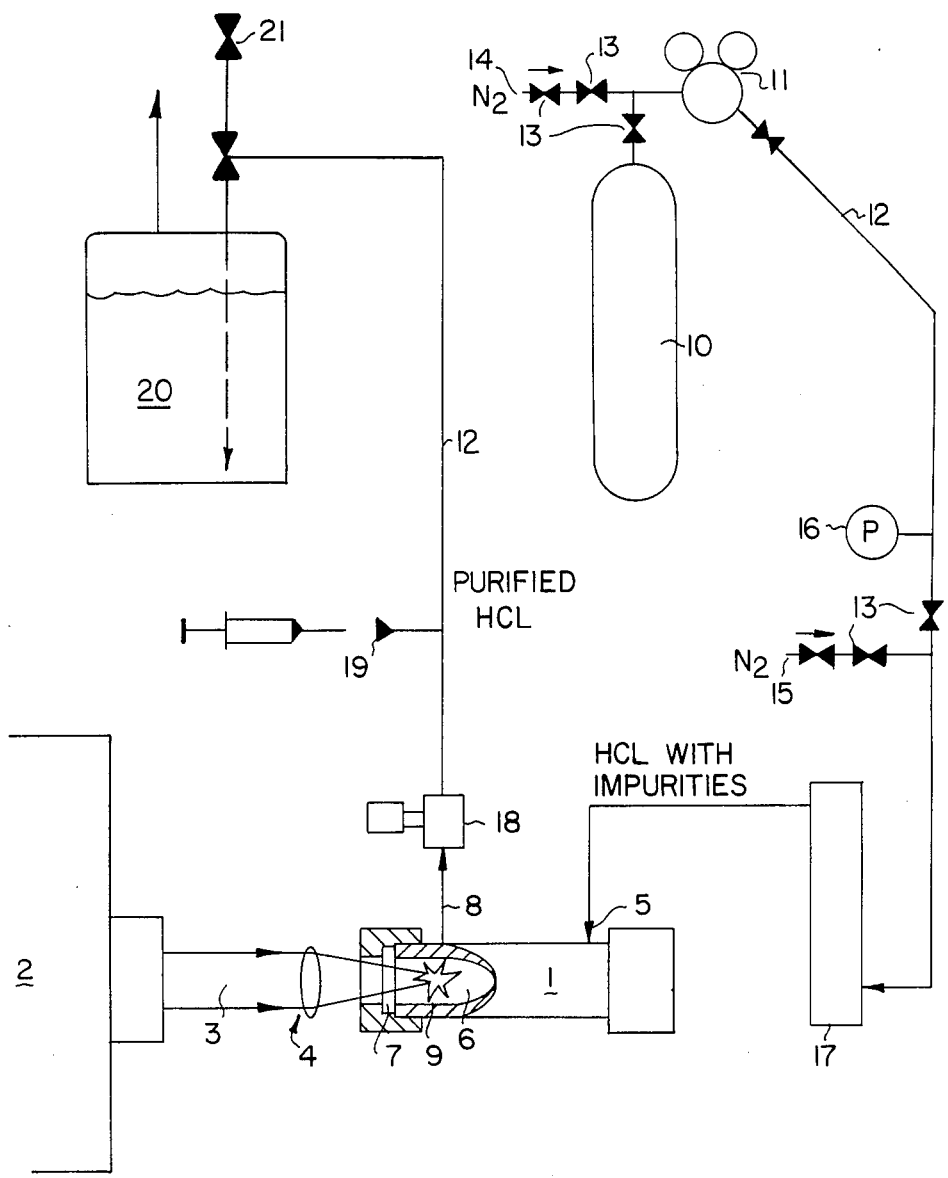
FIG. 1 is a schematic representation of a process of the invention.

The process of the invention comprises subjecting a gaseous, anhydrous stream of a hydrogen halide, e.g., hydrogen fluoride, hydrogen chloride or hydrogen bromide perferably hydrogen chloride, containing up to about 4000 ppm by volume, e.g., 0.1–1,000 ppm, preferably about 10 to 40 ppm by volume of one or more of the aforesaid organic impurities which are to be removed, to laser radiation, thereby decomposing the organic impurities substantially entirely to atomic constituents. The atomic constituents are thereafter separated by physical means from the hydrogen halide.

The process has been found to be particularly effective to remove ethylene from hydrogen chloride containing impurities consisting predominantly of ethylene. As used herein, "consisting predominantly of" means consisting at least 75% of ethylene. However, the process is also applicable to the removal of other volatile unsaturated and halogenated hydrocarbons, e.g., those having a boiling point below 100° C. and up to three carbon atoms, e.g., propylene, acetylene and chloroethylene and ethyl chloride, and mixtures thereof, from all of the hydrogen halides.

Hydrogen chloride, when produced commerically from 1,2-dichloroethane, contains ethylene as the chief constituent of the organic impurities present therein. In such processes, the resultant hydrogen chloride frequently contains acetylene as the main impurity, but this may be easily removed catalytically after the first stage of purification. Known methods of removing ethylene from a stream of hydrogen chloride include fractional liquefication, distillation, scrubbing and catalytic conversion. These methods however may not be satisfactory in that they may not be efficiently capable of yielding an ultra-high purity hydrogen chloride containing less than about 0.005% ethylene.

A $CO_2$ laser which produces laser radiation having a predominant wavelength of from about 9 to 11 micrometers, has been found to be particularly advantageous for use in the process. The preferred predominant wavelength used is in the range of from about 10.4 to about 10.6 micrometers.

The process of the invention efficiently and effectively removes ethylene from hydrogen chloride. It has been found that an untuned industrial $CO_2$ laser is particularly suited for this purpose. Untuned industrial $CO_2$ lasers produce laser radiation having a wavelength of about 10.59 micrometers. Ethylene absorbs laser radiation of this wavelength readily while HCl is substantially transparent thereto. Other organic impurities may also be efficiently removed by laser radiation produced from a $CO_2$ laser.

The precise reaction mechanism by which the ethylene, or other organic impurities are decomposed to atomic constituents is not fully understood. Preliminary experiments performed on hydrogen chloride containing about 13 ppm, of ethylene were conducted by irradiating the hydrogen chloride containing the ethylene with laser radiation at a wavelength of 10.6 micrometers, a wavelength strongly absorbed by ethylene. During the course of the experiments, occasional dielectric breakdown was observed. This dielectric breakdown, also known in the art as the "laser spark" phenomenon, generates a plasma similar to microwave-induced and other plasmas. The dielectric breakdown was evidenced by a visible spark. It became evident that the ethylene was decomposed and removed from the system only when such dielectric break-down occured. It is believed that the breakdown occurs in hydrogen chloride because it is ionizable and the final products of the reaction induced by a laser spark, e.g., hydrogen, carbon and hydrogen chloride when the starting reaction mixture comprises hydrogen chloride containing a small amount of ethylene, is determined by the heat of the generated plasma and the thermodynamics of recombination of the subsequent products. Laser-induced breakdown is well known in the art. See, e.g., *Laser-Induced Discharge Phenomena*, Y. P. Raizer; Consultants Bureau: New York, 1977 and *Effects of High-Powered Laser Radiation*, J. F. Ready; Academic Press: New York, 1971.

The reaction can be carried out in a closed vessel, e.g., in a standard IR gas cell, or in a flowing reactor system in which a stream of the hydrogen halide is subjected to the laser radiation.

The reaction products are separated by conventional means known in the art. Elemental hydrogen is separated by subjecting the hydrogen chloride/hydrogen mixture to a pressure and temperature which liquifies only the hydrogen chloride and separating the gaseous hydrogen from the liquefied hydrogen chloride. The carbon produced by the reaction is easily removed by techniques known in the art such as filtration, sedimentation or centrifugation.

Apparatus for carrying out the invention is illustrated schematically in FIG. 1, in which the reactor system is designated generally as 1. The reactor is generally cylindrical and has a length of about 10 cm and an internal diameter of about 2.5 cm. Hydrogen halide containing the organic impurity to be removed is introduced via inlet 5, flows through the reaction chamber 6, where it is subjected to laser radiation generated from a $CO_2$ laser 2. The $CO_2$ laser can be of the pulsed type or the continuous-wave type and emits a collimated beam of laser radiation 3 which is preferably focused by a lens 4. The laser is operated at a power output sufficient to induce dielectric breakdown at area 9 when the beam is focused through a suitable lens. The reactor includes a transparent window 7 formed, e.g., from KBr, which allows laser radiation to pass therethrough. Other materials such as KRS-5 (thallium bromide iodide, TlBr-TlI) can be used for the window. The irradiated hydrogen halide exits the reactor via outlet 8.

The overall system includes a source of organic impurity-containing hydrogen halide, e.g., a tank of compressed, liquefied hydrogen halide and suitable pressure regulating means 11 to control the gas pressure in the flowline system which is generally designated as 12. The flowline system is equipped with a plurality of control valves 13 adapted to control the flow of gas within the system, the introduction of hydrogen halide and, e.g., gaseous nitrogen to the system. The gaseous nitrogen is introduced at, e.g., inlets 14 and 15 to purge the system when desired. The flowline system also preferably includes a suitable pump 16, e.g., an aspirator-type pump, a suitable flow meter 17, e.g., a rotameter, both upstream of the reactor and a suitable metering valve 18 downstream of the reactor to control the rate of removal of irradiated hydrogen halide from the reactor and also to control the pressure within the reactor. A sampling port 19 is provided through which the reaction products may be withdrawn for analysis. The irradiated hydrogen halide is then recovered from the system by withdrawing it from outlet 21, which may be at the far downstream end of the system. For experimental purposes a scrubber which functions as a hydrogen halide trap, generally designated as 20, can be provided at the far downstream end of the system. The tubing, fittings, reservoirs and the reactor body are preferably fabricated from stainless steel, or "MONEL" metal (nickel-copper alloy). Some of the tubing downstream of the reactor may be fabricated from poly-ethylene if desired and the scrubber may also be fabricated from polyethylene.

The system can also be provided with a sedimentation chamber, a filtration zone, or the like, to remove carbon produced in the reaction.

The volume of the reactor can be varied by inserting an annular plug therein. Thus, the volume is determined by the length and internal diameter of the plug, subtracted from the original volume of the reactor.

It has been found that the laser-induced dielectric breakdown occurs more readily at higher pressures. Accordingly, the pressure of the gas stream inside the reactor is preferably maintained at a pressure of from about 15 to about 200 psi.

Optimum flow rates of the reactants through the reactor can be calculated based on the volume of the reactor. Thus, it the reactor has a length of 10 cm and an internal diameter of 2.5 cm, the optimum flow rate through the reactor would be 500 cc/min. This can be calculated by dividing the reactor volume by 0.1 min, the optimum residence time for a 20-watt laser.

The ratio of power to flow rate of the hydrogen halide through the reactor determines the amount of laser radiation received by the hydrogen halide containing the impurities. Surprisingly, although low amounts of laser radiation initiate reactions of the hydrogen halide with unsaturated organic impurities therein to form halogenated products, if the amount of radiation received by the hydrogen halide and impurities is increased beyond that required to initiate the aforesaid reactions, breakdown of the halogenated products into their elemental constituents results. For example, with hydrogen chloride containing about 5.5 ppm ethylene, 2 ppm acetylene and 4 ppm ethyl chloride, when the power to flow ratio (measured in mW/cc/min) is about 8.1, although the ethylene content is reduced by about 91%, ethyl chloride and dichloroethane contents of about 6 and 4 ppm, respectively result, thereby increasing the organic impurities content. However, when the power/flow ratio is increased to 18.7, the level of organic impurities is reduced about 21% and when the power/flow ratio is increased to 65, the level of organic impurities is reduced by about 58%. At a power/flow ratio of 236, all organic impurities are essentially eliminated.

When the hydrogen halide containing the aforesaid impurities to be removed is subjected to lower levels of laser radiation, a power-to-flow ratio of from about 3 to about 20 mW/cm/min., a portion of the impurities are substantially entirely decomposed while the remainder are converted to halogenated hydrocarbons. If such lower power-to-flow ratios are used, the resultant halogenated products can be separated by fractional distillation. When the hydrogen halide containing the aforesaid impurities to be removed are subjected to relatively higher levels of laser radiation, e.g., power-to-flow ratios of from about 20 to about 200 mW/cm/min., the impurities are substantially entirely decomposed.

In any event, it is necessary that a sufficient amount of laser radiation be focused into the reactor in order to induce dielectric breakdown. It is preferable that the density of laser radiation at the focal point of the lens in the reactor be in the range of from about 400 to about 30,000 Mw/cm$^2$. More preferably, the density of the radiation at the focal point of the lens is about 5000 Mw/cm$^2$.

In following examples two sets of reactions were carried out. One set was carried out in a standard 10 cm IR gas cell filled with the hydrogen halide to be purified, i.e., the cell was sealed and no additional hydrogen halide was admitted to the cell during reaction. The other set of reactions was carried out in a system represented schematically in FIG. 1.

The examples illustrate the use of a pulsed $CO_2$ laser. However, a continuous wave $CO_2$ laser is preferred.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by volume.

COMPARATIVE EXAMPLE A

A standard 10 cm IR gas cell (vol. 134ml) was filled with hydrogen chloride containing about 25 ppm ethylene. Unfocused laser radiation at a wavelength of about 10.6 micrometers emitted from a pulsed $CO_2$ laser was directed into the cell. Irradiation was continued for 10 minutes at a power of 0.6 watts and a pulse frequency of 5 Hz. No dielectric breakdown or laser spark was observed in the reactor. After irradiation the reactor contents were sampled and the sample was analyzed by gas chromatography using a stationary phase comprising at least 4 feet of "Porasil B" or "Unibeads" in ⅛ inch nickel tubing and a diphenylamine stripper column on a Hewlett-Packard 5793A gas chromatograph with a flame ionization detector. The results of analysis showed no change in the concentration of ethylene present as the impurity in hydrogen chloride, the reason being insufficient power to cause substantial dielectric breakdown.

COMPARATIVE EXAMPLE B

The procedures of Comparative Example A were followed except that the laser radiation was focused into the reactor through a lens having a focal length of 36 cm. During irradiation, occasional dielectric breakdown was observed. Subsequent analysis by gas chromatography indicated no significant change in the concentration of ethylene present as the impurity in hydrogen chloride, the reason being insufficient dielectric breakdown.

COMPARATIVE EXAMPLE C

The procedure of Comparative Example A was followed except that the laser radiation was focused into the reactor through a lens placed 2.6 cm from the window of the reactor and having a focal length of 7.5 cm. The reactants were irradiated for 5 minutes at a power output of 2.55 watts and a pulse frequency of 20 Hz. During reaction, frequent dielectric breakdown was observed. Subsequent analysis by gas chromatography determined that the concentration of ethylene present as an impurity in the hydrogen chloride was reduced by 50%. However, dielectric breakdown did not occur frequently enough to reduce the ethylene content entirely.

EXAMPLE 1

The procedures of Comparative Example C were followed except that the irradiation was continued for 10 minutes at a power of 3.7 watts and a pulse frequency of 30 Hz. Frequent or almost constant dielectric breakdown was observed and subsequent analysis determined that substantially all of the ethylene had been removed from the hydrogen chloride to the extent that any ethylene remaining was not detectable by the gas chromatograph.

EXAMPLE 2

The procedures of Example 1 were followed except that the irradiation was continued for 5 minutes at a power of 6.4 watts and a pulse rate of 60 Hz. Again frequent to almost constant dielectric breakdown was observed and subsequent analysis indicated that substantially all of the ethylene had been removed from the hydrogen chloride to the extent that any ethylene remaining was not detectable by the gas chromatograph.

EXAMPLE 3

The procedures of Example 2 were followed except that the irradiation was continued for 2½ minutes. Again frequent or almost constant dielectric breakdown was observed and subsequent analysis indicated that most of the ethylene, i.e., about 82%, had been removed from the hydrogen chloride.

COMPARATIVE EXAMPLE D

The reaction system illustrated schematically in FIG. 1 was employed using a reactor having a 2.5 cm (internal) diameter and a 10 cm length, an uncalibrated flow meter, e.g., a Matheson 602 or 604, a lens having a focal length of 7.5 cm place about 4 cm from the transparent window of the reactor. Hydrogen chloride containing about 5-10 ppm ethylene was flowed through the reactor at a rate which indicated 15% capacity of the flow meter. Laser radiation of about 1 watt power and 30 Hz pulse frequency was focused through the transparent window of the reactor through the lens. Only a slight dielectric breakdown was observed and subsequent analysis by gas chromatography that only about 40% of the ethylene was removed.

EXAMPLE 4

The procedures of Comparative Example D were followed except that the rate of flow through the reactor was maintained such that the flow meter indicated a flow of about 10% of capacity. Fairly steady dielectric breakdown was observed, and subsequent gas chromatography indicated that most of the ethylene, i.e., about 90%, had been removed.

EXAMPLE 5

The procedures of Example 4 were followed except that the hydrogen chloride containing ethylene as an impurity in an amount of 10 ppm was flowed through the reactor, the laser was operated at a wavelength of 10.5 micrometers, the laser radiation was focused in the reactor such that the density of radiation at the focal point was 3000MW/cm$^2$ and the frequency of pulses was 30 Hz. Hydrogen chloride containing 10 ppm ethylene was flowed through the reactor at a flow rate of 30.0 cc/min. Subsequent analysis by gas chromatography indicated that about 31% of the ethylene had been removed.

EXAMPLE 6

The procedures of Example 5 were followed except that the flow rate of the hydrogen chloride containing the ethylene impurity was flowed through the reactor at a flow rate of about 15 cc per min. Subsequent analysis by gas chromatography showed that about 79% of the ethylene had been removed from the hydrogen chloride.

EXAMPLE 7

The procedures of Example 6 were followed except that the laser was operated at a wavelength of 10.6 micrometers. Subsequent analysis by gas chromatography indicated that about 38% of the ethylene had been removed from the hydrogen chloride.

EXAMPLE 8

The procedures of Example 7 were followed except that the hydrogen chloride containing the ethylene impurity therein was flowed through the reactor at a rate of 10.0 cc per min. Subsequent analysis by gas chromatography indicated that about 91% of the ethylene had been removed from the hydrogen chloride.

EXAMPLE 9

Hydrogen chloride containing about 7 ppm ethylene was flowed through a reactor at a rate of 8 liters per minute and a residence time of 0.65 seconds. Laser radiation at a wavelength of 10.6 micrometers and a pulse frequency of 8 Hz was focused under the reactor with a lens having focal length of 2.5 cm attached to the window of the reactor. The laser was operated at a power of about 6 watts. Subsequent analysis by gas chromatography showed that the hydrogen chloride which had passed through the reactor contained about 3.0 ppm ethylene.

EXAMPLE 10

The procedures of Example 9 were followed except that laser radiation having a power of about 14 watts was focused into the reactor. Subsequent analysis by gas chromatography showed that the hydrogen chloride withdrawn from the reactor contained ethylene as an impurity at a concentration of about 1.8 ppm.

EXAMPLE 11

The procedures of Example 9 were followed except that laser radiation having a power of about 19 watts was focused into the reactor. The thus-irradiated hydrogen chloride withdrawn from the reactor was subsequently analyzed and the concentration of ethylene present as an impurity therein was determined by gas chromatography to be about 1.7 ppm.

EXAMPLE 12

The procedures of Example 11 were followed except that laser radiation having a power of about 29 watts was focused into the reactor. Subsequent analysis by gas chromatography indicated that the hydrogen chloride withdrawn from the reactor contained ethylene as an impurity present in an amount of about 0.4 ppm.

EXAMPLE 13

The general procedures of Examples 9-12 above were followed except that the starting hydrogen chloride also contained, in addition to ethylene, various amounts of methane, ethane, chloroethane, 1,1-dichloroethane, 1,2dichloroethane. Four separate reactions were carried out in a reactor having an 8.6 cc volume, in which the pulse rate of the laser was varied and the power output of the laser was varied. The results are summarized in Table 1 below wherein the concentration of the constituents both before and after reaction is shown.

The results indicate that ethylene is decomposed at each of the power levels but that over-all concentrations of all impurities is reduced only at higher power levels.

EXAMPLE 14

A stream of anhydrous CHl containing 5.5 ppm ethylene, 2 ppm acetylene, 4 ppm ethyl chloride is passed through a large reactor similar to that shown in FIG. 1 at the rate of 400 l/min. A pulsed laser emitting 3200W at 10.6 micrometers is aimed at the reactor. The resulting HCl; contains 0.4 ppm ethylene, 6 ppm ethyl chloride, and 4 ppm 1,1-dichloroethane. The boiling points of the components of this gas are

| | |
|---|---|
| HCl | −85° C. |
| $C_2H_4$ | −102° C. |
| $C_2H_5Cl$ | 12° C. |
| $C_2H_4Cl_2$ | 83° C. |

The gas is passed through a condenser cooled with ice water, thereby causing the chlorinated compounds to liquify. The liquified compounds are separated in a conventional manner. The resulting HCl containing 0.4 ppm ethylene is then liquified into tanks for shipment.

EXAMPLE 15

A stream of anhydrous HCl containing the same impurities of example 14 discharged through a large reactor similar to that shown in FIG. 1 at the rate of 100 l/min. A pulsed laser emitting 23.6 KW at 10.6 micrometers is aimed at the reactor. At high power the reaction products of the impurities are essentially HCl and carbon, which is present as tiny particles and which are removed by passing the gas steam eminating from the reactor through a 1 μm filter. The HCl is then liquified into tanks for shipment as in the previous example.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for converting ethylenically unsaturated hydrocarbons of from 2-3 carbon atoms and acetylene, in anhydrous hydrogen halide containing up to about 4,000 ppm by volume thereof, into one or more reaction products readily separable from the hydrogen halide, comprising subjecting the hydrogen halide containing the organic impurities to laser radiation having a wavelength corresponding to a wavelength at which the impurity absorbs radiation, in an amount effective to achieve dielectric breakdown.

2. A process according to claim 1 wherein the hydrogen halide is hydrogen chloride.

3. A process according to claim 1 wherein the unsaturated hydrocarbon consists essentially of ethylene.

4. A process according to claim 3 wherein the amount of laser radiation is sufficient to convert the unsaturated hydrocarbon substantially entirely to its elemental constituents.

5. A process according to claim 1 wherein the starting hydrogen halide contains about 10 ppm to about 40 ppm by volume of the unsaturated hydrocarbon.

6. A process of claim 1 wherein a continuous stream of hydrogen halide is passed through the area in which dielectric breakdown occurs.

7. A process of claim 1 wherein the laser radiation is at a wavelength of from about 9 to 11 micrometers.

8. A process of claim 7 wherein the laser radiation is at wavelength of about 10.59 micrometers.

9. A process of claim 1 wherein the hydrogen halide is hydrogen chloride, the unsaturated hydrocarbon impurity consists essentially of ethylene and is present in the hydrogen chloride at a concentration of about 0.1 ppm to about 350 ppm.

10. A process according to claim 9 wherein the amount of laser radiation is sufficient to convert the unsaturated hydrocarbon substantially entirely to its elemental constituents.

11. A process according to claim 9 wherein the laser radiation is at a wavelength of about 10.59 micrometers.

12. A process of claim 1 wherein the amount of laser radiation is sufficient to provide a power/flow ratio of at least about 18.7 mW/cm/min.

13. A process of claim 1 wherein the amount of laser radiation is sufficient to provide a power/flow ratio of at least about 65 mW/cm/min.

14. A process of claim 1 wherein the amount of laser radiation is sufficient to provide a power/flow ratio of at least about 236 mW/cm/min.

TABLE 1

| | Organics Content before/after, ppm (volume) | | | | | | |
|---|---|---|---|---|---|---|---|
| power mW flow, cc/min | $CH_4$ | $C_2H_6$ | $C_2H_4$ | $CH_2CHCl$ | $CH_3CH_2Cl$ | $CH_3CHCl_2$ | Total |
| 236 | 2/0 | 0.5/0 | 6.5/0 | 3/0 | 4/0 | 0/0 | 16/0 |
| 165 | 2/0 | 0.5/0 | 6.5/0 | 3/0 | 4/2 | 0/2 | 16/4 |
| 18.7 | 2/1.8 | 0.5/0 | 6.5/.3 | 3/0 | 4/4 | 0/4 | 16/10.1 |
| 8.1 | 2/1.0 | 0.5/0.45 | 6.5/.5 | 3/0 | 4/6 | 0/5 | 16/13 |

* * * * *